(12) United States Patent
Palamadai et al.

(10) Patent No.: US 12,126,544 B2
(45) Date of Patent: Oct. 22, 2024

(54) SYSTEM AND METHOD ADAPTED TO SIMPLIFY USER EQUIPMENT REQUIREMENTS DURING TRAVEL

(71) Applicant: AT&T Intellectual Property I, L.P., Atlanta, GA (US)

(72) Inventors: Rashmi Palamadai, Naperville, IL (US); Yupeng Jia, South Pasadena, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 44 days.

(21) Appl. No.: 17/894,511

(22) Filed: Aug. 24, 2022

(65) Prior Publication Data

US 2024/0073155 A1    Feb. 29, 2024

(51) Int. Cl.
*H04L 47/80* (2022.01)
*H04L 67/52* (2022.01)

(52) U.S. Cl.
CPC .............. *H04L 47/80* (2013.01); *H04L 67/52* (2022.05)

(58) Field of Classification Search
CPC ................................ H04L 47/80; H04L 67/52
See application file for complete search history.

(56) References Cited

U.S. PATENT DOCUMENTS

| | | | |
|---|---|---|---|
| 2012/0113143 A1* | 5/2012 | Adhikari | G06Q 30/0623 345/633 |
| 2013/0036372 A1* | 2/2013 | Priebe | G06F 3/0481 715/757 |
| 2013/0144978 A1* | 6/2013 | Jain | H04W 4/02 709/219 |
| 2014/0082526 A1 | 3/2014 | Park et al. | |
| 2014/0247807 A1 | 9/2014 | Westerberg et al. | |
| 2015/0264614 A1 | 9/2015 | Stager et al. | |
| 2017/0086103 A1 | 3/2017 | Neves et al. | |
| 2017/0280361 A1 | 9/2017 | Cabral et al. | |
| 2018/0091985 A1 | 3/2018 | Thanayankizil et al. | |
| 2018/0102985 A1* | 4/2018 | Byers | H04L 47/80 |
| 2018/0255335 A1* | 9/2018 | George | H04N 21/4532 |
| 2019/0090174 A1 | 3/2019 | Rocci et al. | |
| 2019/0191265 A1 | 6/2019 | Altintas et al. | |
| 2020/0082613 A1 | 3/2020 | Eyler et al. | |
| 2020/0115056 A1 | 4/2020 | Johnson | |

(Continued)

*Primary Examiner* — Benjamin M Thieu
(74) *Attorney, Agent, or Firm* — Guntin & Gust, PLC; Miyoung Shin

(57) ABSTRACT

Aspects of the subject disclosure may include, for example, determining a personalized cloud service requirement based on a user identity and proximity to a first location. A first edge network is configured based on the personalized cloud service requirement and the first location, and the user is provided with access to a personalized cloud service via the configured first edge network according to their proximity to the first location. A second, different location is determined, and a second edge network is configured based on the personalized cloud service requirement and according to the second location. The user is provided with access to the personalized cloud service via the configured second edge network according to their proximity to the second location. In this manner, the edge network may be reconfigured to effectively follow the user, thereby extending remote access to a consistent, personalized cloud service. Other embodiments are disclosed.

20 Claims, 9 Drawing Sheets

(56) References Cited

U.S. PATENT DOCUMENTS

| | | |
|---|---|---|
| 2020/0175761 A1* | 6/2020 | Jones .................. G02B 27/017 |
| 2020/0266903 A1 | 8/2020 | De Rosa et al. |
| 2020/0296789 A1 | 9/2020 | Wang et al. |
| 2021/0045189 A1 | 2/2021 | De Moura et al. |
| 2021/0110710 A1 | 4/2021 | Wang et al. |
| 2021/0126986 A1 | 4/2021 | Rolf et al. |
| 2021/0281529 A1* | 9/2021 | Baron .................... H04L 51/42 |
| 2021/0295684 A1 | 9/2021 | Cen et al. |
| 2021/0396539 A1 | 12/2021 | Eyler et al. |
| 2022/0103969 A1* | 3/2022 | Drummond ............. H04L 67/52 |
| 2022/0177003 A1 | 6/2022 | Singh et al. |
| 2022/0191199 A1 | 6/2022 | Sambi et al. |

\* cited by examiner

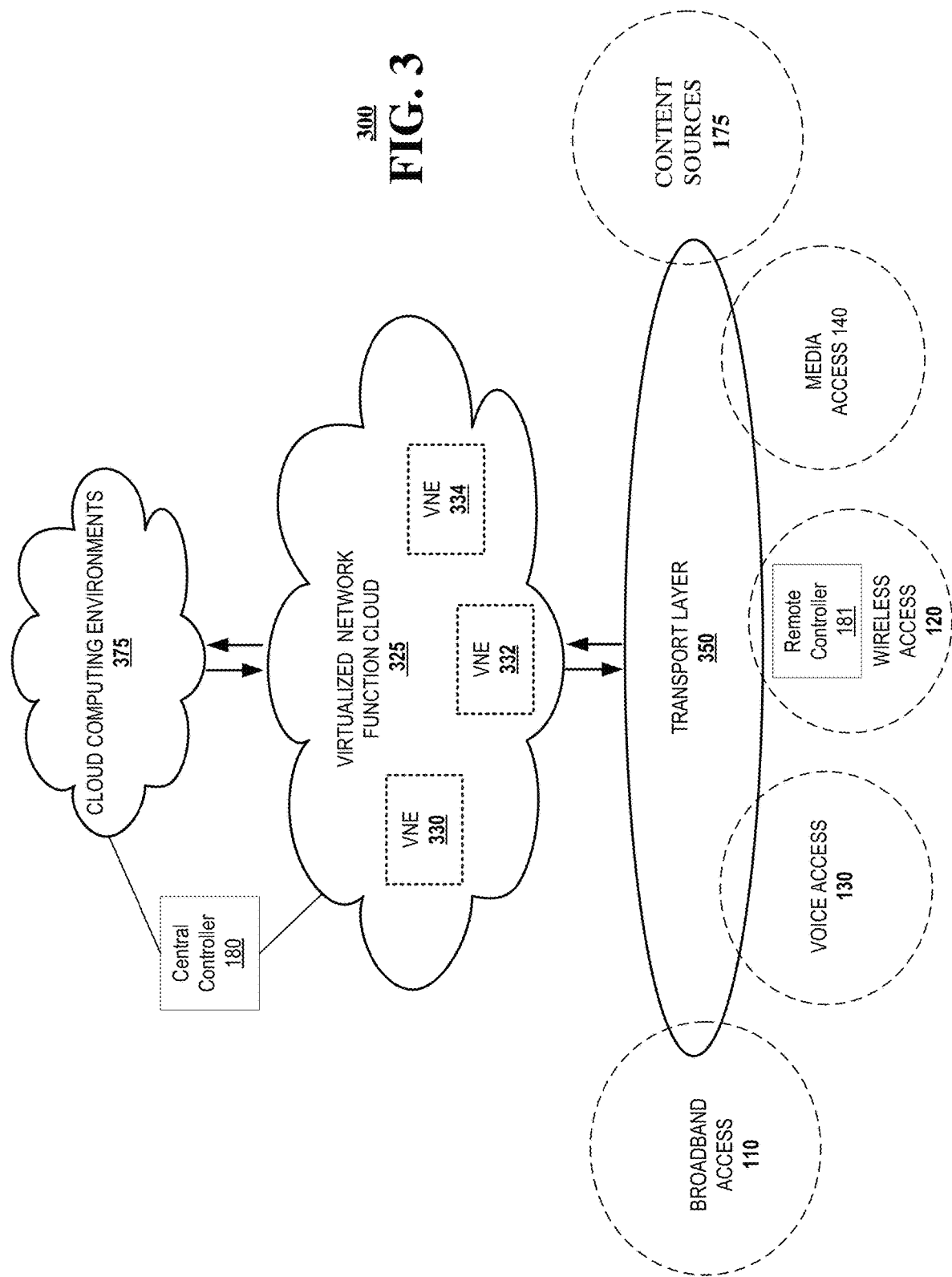

SYSTEM AND METHOD ADAPTED TO SIMPLIFY USER EQUIPMENT REQUIREMENTS DURING TRAVEL

FIELD OF THE DISCLOSURE

The subject disclosure relates to a system and method adapted to simplify user equipment requirements during travel.

BACKGROUND

Recent technological advances computing, storage, networking, battery life and mobile communications have combined to support an explosion in varieties of mobile user platforms, online services and general reliance upon such items for conducting business, entertainment and even routine daily activities. Online environments have grown in importance in both personal and professional applications, and across varied age groups. Young and old alike have become accustomed to spending increased time engaging in online activities, e.g., from communicating, socializing, accessing news and information, researching, educating, working, shopping, banking, entertainment, and the like. As such, users have become familiar with online experiences and/or environments, including virtual reality (VR), augmented reality (AR) and/or extended reality (XR) environments and applications.

The vast number and variety of online services, service providers, applications and so on is also expansive, and at times complex in that certain applications and/or online environments may impose certain demands on user equipment. For example, a professional may conduct business on a work laptop or phone. The same individual may conduct personal business on a personal laptop and/or smartphone, and perhaps enjoy entertainment on the same devices and/or a smart TV and/or tablet device and so on. Arguably, such varied requirements imposes a burden on the end user to provide the appropriate user equipment to the task at hand.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
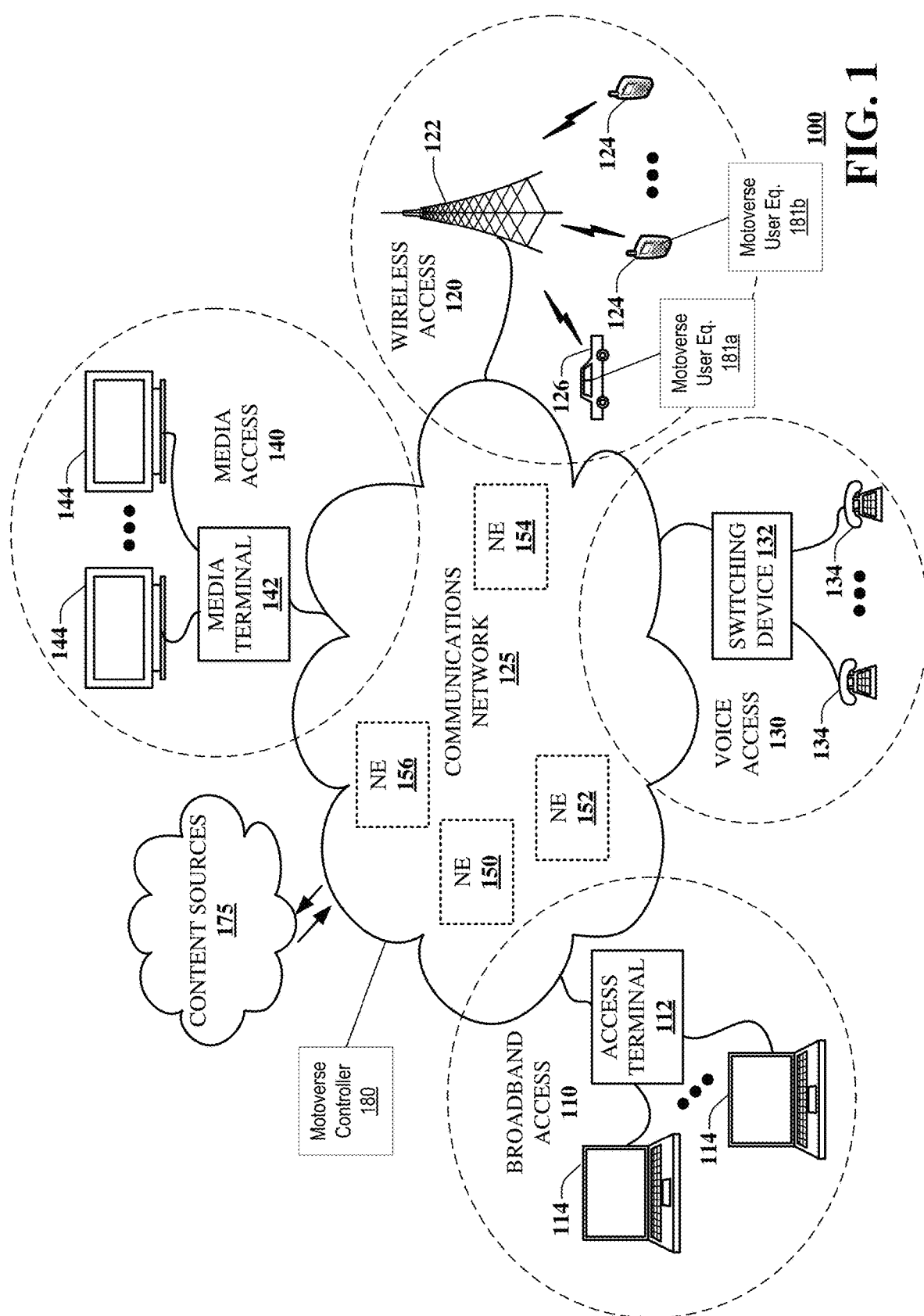
FIG. 1 is a block diagram illustrating an exemplary, non-limiting embodiment of a communications network in accordance with various aspects described herein.

The subject disclosure describes, among other things, illustrative embodiments for reconfiguring edge cloud resources of a network responsive to changes in a user's location during periods of travel, to provide the user with access to a consistent, personalized cloud service, while also supporting the user's access to a rich set of online features, functions and content without imposing complex requirements on user equipment. Other embodiments are described in the subject disclosure.

One or more aspects of the subject disclosure include a process, which includes identifying, by a processing system including a processor, an identity of a traveler. The process further includes determining, by the processing system, a personalized cloud service requirement based on the identity of the traveler, and determining, by the processing system, a first location, wherein the traveler is proximate to the first location at a first time. The process further includes provisioning, by the processing system, a first edge cloud resource, to obtain a provisioned first edge cloud resource, based on the personalized cloud service requirement and according to the first location of the traveler. The traveler is provided access to a personalized cloud service via the provisioned first edge cloud resource. Still further, the process includes determining, by the processing system, a second location, wherein the second location differs from the first location, and re-provisioning, by the processing system, a second edge cloud resource, to obtain a provisioned second edge cloud resource, based on the personalized cloud service requirement and according to the second location of the traveler. The traveler is provided access to the personalized cloud service via the provisioned second edge cloud resource.

One or more aspects of the subject disclosure include a device, comprising: a processing system including a processor and a memory that stores executable instructions. The instructions, when executed by the processing system, facilitate performance of operations that include determining an identity of a user, determining a personalized cloud service requirement based on the identity of the user and determining a first location. According to the operations, a first edge network resource is configured, to obtain a configured first edge network resource, based on the personalized cloud service requirement and according to the first location. The user is provided access to a personalized cloud service via the configured first edge network resource. Further according to the operations, a second location is determined, wherein the second location differs from the first location and a second edge network resource is configured, to obtain a configured second edge network resource, based on the personalized cloud service requirement and according to the second location. The user is provided access to the personalized cloud service via the configured second edge network resource.

One or more aspects of the subject disclosure include a non-transitory, machine-readable medium, including executable instructions that, when executed by a processing system including a processor, facilitate performance of operations. The operations include determining a personalized cloud service requirement based on an identity of a user. The operations further include determining a first proximity of the user to a first location and configuring a first edge network resource, to obtain a configured first edge network resource, based on the personalized cloud service requirement and the first location. The user is provided access to a personalized cloud service via the configured first edge network resource according to the first proximity of the user to the first location. The operations further include determining a second location, wherein the second location differs from the first location, the operations and configuring a second edge network resource, to obtain a configured second edge network resource, based on the personalized cloud service requirement and according to the second location. The user is provided access to the personalized cloud service via the configured second edge network resource according to a second proximity of the user to the second location.

In some situations, a person may choose and/or be required to conduct various online activities while away from home or the office on travel. Given the variety of available activities and/or modes of online activity, a traveler today may find themselves having to carry a large number of devices and/or accessories, e.g., a work laptop, a work phone, a personal phone, perhaps a virtual reality (VR) headset or lens, a tablet, batteries, chargers, cables, and the like. Understandably, a traveler may not want to carry so much equipment, yet still to access their documents, content and/or applications, such as a VR meta space, e.g., a metaverse, work and/or education systems, online gaming. The traveler would still prefer to have the necessary compute and/or processing capabilities to perform a wide variety of tasks.

The various devices, systems, processes and software disclosed herein address the long-felt user needs by providing a traveler with an online experience that is both expansive and rich in content in features, without requiring that they carry different types user equipment. In at least some embodiments, the user may have to carry little more than their smartphone or tablet, or in at least some instances, no equipment at all. In these instances, the traveler's vehicle, e.g. their airplane, connected car, and/or public transportation may facilitate access to one or more online environments. The online environments may be adapted, configured and/or otherwise tailored to the individual traveler's needs and/or to a traveler's class, e.g., a child, a student, a vacationer, a professional. In at least some embodiments, the vehicle offers a "motorverse" service and/or becomes the "motorverse," e.g., providing some or all hardware, software, network, applications, services, on-demand and adapted, configured and/or otherwise tailored to suit the individual traveler's needs. By doing so, the users may travel with a minimal "extra light" device, knowing that their needs will be met by the vehicle and/or motorverse where they will travel.

It is worth noting here that although reference is made to the motorverse being available while on a transportation platform, it is conceivable that it may also be provided at destinations, e.g., hotels, conference centers, businesses, public venues, and so on. Thus, a traveler may extend their motorverse service experience beyond the particular mode of transportation, to provide a seamless motorverse service for an entire duration of a trip.

Depending upon the mode of transport, e.g., an airplane and/or a train that may carry scores or even hundreds of passengers, it is understood that in at least some embodiments, there may be large groups of users. In such instances, it is conceivable that the "motorverse" may be sized to provide enough resources for most if not all users present. In at least some embodiments, estimates of a number of riders that may participate, i.e., participating travelers, may be obtained beforehand to allow a transportation service provider, alone or in combination with one or more network service providers, to provision, configure and/or otherwise arrange sufficient resources.

According to the subject disclosure, one or more network resources, e.g., one or more edge networks, may be reconfigured responsive to changes in a user's location. Changes may occur, for example, while traveling and/or during temporary stays at remote locations, e.g., while on vacation and/or during a business trip. The reconfigured network resources may be adapted to provide a traveler, the user, with access to a personalized cloud service. The personalized cloud service may be persistent, e.g., retaining state information, such as authentication information, user data, user applications, preferences, and the like, despite a redirecting of network resources to accommodate user travel. Alternatively or in addition, the personalize cloud service may be consistent, e.g., presenting a common presentation to the user, e.g., according to one or more of a common set of functions, a common user interface, a common organization of information and related resources. It is understood that such consistency may be desirable in at least some instances to capitalize on a user's familiarity with a personal and/or home office online experience, e.g., in that little or no time demands are imposed for learning a new arrangement, interface, etc.

By way of example, in at least some embodiments, one or more edge network resources, e.g., edge clouds, may be reconfigured according to a relocation of the user. In this manner, the network-side reconfigurations effectively allow a user's applications and/or content cloud to follow them, while preserving one or more of network efficiencies, and/or service level agreements, e.g., with respect to data rates, latency, availability, and the like. In at least some embodiments, such a reconfiguration of resources may facilitate user access to a rich set of online features, functions and content while away from their home and/or office, without imposing requirements for burdensome user equipment, e.g., desktop processors, large screens, multiple screens, keyboards, mice, VR glasses, gaming controllers, chargers, network and/or adaptor cabling and the like.

For example, in at least some embodiments, the user's cloud services may be accessible and/or otherwise operable by one or more relatively simple devices, such as a single tablet device and/or a wearable computer. Wearable computers may include a VR headset and/or a Glass® wearable computer that provides a transparent display for hands-free work, available from Google LLC of Mountain View, CA. Other devices may rely on user gestures and/or projections of user interfaces, such as keyboards and/or touchpad/touchscreen surfaces. Thus, a user may access communication and/or computational resources, including one or more diverse applications, such as email, text, chat, spreadsheets, still images, video, gaming, including multiplayer interactive gaming, virtual reality, augmented reality, search engines, library resources, business application, and so on. In at least some instances, the user's remotely provisioned cloud services may be referred to as a "miniverse" environment.

Referring now to FIG. 1, a block diagram is shown illustrating an example, non-limiting embodiment of a system 100 in accordance with various aspects described herein. For example, system 100 can facilitate in whole or in part reconfiguring edge network resources of a network responsive to changes in a user's location during periods of travel, to provide the user with access to a consistent, personalized cloud service, while also supporting the user's access to a rich set of online features, functions and content without imposing complex requirements on user equipment. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system 100 includes a traveling cloud services controller, sometimes referred to herein as a "motorverse" controller 180. The motorverse controller 180 may be in communication with one or more elements of the example system 100 either directly and/or via a network connection. According to the example, the motorverse controller 180 is in communication with the communications network 125. One or more mobile platforms, such as the example vehicle 126, may be configured with user equipment, sometimes referred to herein as "motorverse" user equipment and/or a motorverse interface 181. For example, the motorverse interface 181 may be provided as a touchscreen tablet device provided by a transportation carrier operating the vehicle 126. Alternatively or in addition, personal user equipment, e.g., smart phone, tablet, smart watch, laptop, VR/AR headset may serve as the motorverse interface 181b. The motorverse interface 181a, 181b, generally 181, in combination with the motorverse controller 180 and/or one or more other elements of the system 100, e.g., the communications network and/or the base station 122, may be adapted to reconfigure edge cloud resources of the network 125 responsive to changes in a user's location during periods of travel, to provide the user with access to a consistent, personalized cloud service.

The techniques disclosed herein address situations in which a user wants to travel to different locations but may not want to carry hardware, e.g., a phone and a laptop. At least some of the example embodiments may present options on how to log into their personal, professional, and/or network domains using a single end-user device that may be provided by their own user equipment, e.g., a tablet or VR glass, and/or by a transportation service provider, and/or some other facility that caters to travelers, such as hotels and/or conference centers. For example, user profiles may be established and/or otherwise configured to facilitate an application of an appropriate level and/or requirement for privacy and/or security separations. Such provisions allow users to switch between domains virtually, e.g., in an online environment, in a cyberspace and/or in a meta space. At least some solutions may include a VR environment that allows a user to overlay virtual screens, while also maintain an appropriate access and/or security separation between personal and private spaces. The different screens may be observed and/or interacted using the same device, e.g., the same display and/or VR glass.

Suppose the user is traveling from Chicago to Dallas for work, and the user does not want to carry all their computer and/or communication devices. The user may be presented with an option to switch to an online, a cloud and/or virtual mode. Depending upon the user interaction mode offered and/or selected, a setup that user requires may be presented to the user, e.g., transferring their online environment from a Chicago office setup to a Dallas office. Accordingly, at least some if not all of the user's personal and business profiles may be transferred to the virtual environment. In at least some embodiments, a computing, networking and/or cloud edge location determination and/or selection may be made based on the user's location, e.g., geo-coordinates. In at least some embodiments, the portable user environment may move with the user, providing access during a journey, e.g., at one or more locations, and quite possibly a continuum of all traversed locations between journey endpoints, e.g., Chicago and Dallas. For example, a transportation platform and/or one or more networks may be provisioned, configured and/or otherwise adapted to support a user's content cloud that follows them throughout some, if not all, of their journey. In this manner, the user's online experience may traverse distance, borders, oceans, and so on. Pre-approval of a "flight plan" or travel path may be necessary in at least some instances, to avoid any gaps or at least to keep them to a minimum so that edge resource identification and/or authentication may be performed in advance. In at least some scenarios, Band 2 with 5 MHz extension of spectrum (B25) may be provided as needed, e.g., when usage becomes too high on a specific band.

A transportation platform, e.g., a particular flight, may function in at least some capacity as a mobile metaverse. The metaverse may be established in a virtual space that travels with the participating users onboard. Such an adaptable, mobile, transportable online environment may extend new uses and applications based on the motorverse concept. For example, as vehicle, the airplane in this instance, flies through different locations, perhaps different cities, regions and/or across international borders, a representative avatar may appear within the metaverses. The avatar may illustrate and/or otherwise shows what location the user has entered. In at least some embodiments, the avatar may dress, speak and/or act according to local customs and/or cultures. To the extent the motorverse includes a VR mode, the traveler, e.g., by way of a representative avatar, may interact and/or otherwise connect with virtual representations of nearby physical locations. The traveler's avatar may take a virtual walk or tour into a virtual representation of a nearby physical location.

In some embodiments, the visiting avatar may be automated, e.g., preprogrammed and/or responsive to questions based on ML/AI, as in a smart digital assistant. Alternatively or in addition, the visiting avatar may be controlled by a physical user from the nearby locale. The controlling individual may take the form of an ambassador, e.g., a travel guide and/or public official. Alternatively, or in addition, the visiting avatar may be controlled by a general member of the public, e.g., school children and/or other social media participants, who may choose to interact with and/or greet travelers to familiarize them with local sights, sounds and/or customs.

In some embodiments, the travelers' metaverse may be established in a virtual space that travels with the participating users onboard, e.g., allowing a group of users to interact, collaborate and/or socialize. For example, coworkers may choose to collaborate to discuss planes for an upcoming meeting and/or presentation. Family members might choose to collaborate to plan vacation activities, to discuss family matters and/or to discuss entertainment options onboard. In at least some embodiments, a dynamic chatroom may be established prior to an event, such as a conference. The chatroom may allow travelers to collaborate with other travelers on the same flight, and/or on different flights by entering the dynamic chatroom. Alternatively or in addition, the travelers may utilize the chatroom communicate with other individuals who may not be traveling in relation to the particular event, e.g., hosts and/or event coordinators or planners. A chatroom organizer may invite users who are identified as attending a specific event and location to a private online environment, e.g., virtual location, through an application of deep learning, without violating and/or otherwise breaking any preestablished security and/or privacy. A motorverse service provider and/or a chatroom organizer, may virtually bundle a group of individuals to support a mobile work conference, e.g., senior leadership members meeting during a pre-event networking session.

It is envisioned that in at least some embodiments, a traveler may establish a personal virtual environment, e.g., a personal meta space. The individual traveler may be provided with a capacity to allow others to access and/or otherwise participate in the personal meta space. Such a capacity may permit an individual having established a personal meta space to extend invitations to others to join their personal meta space. Alternatively or in addition, an existence of the personal meta space may be shared, e.g., via social media and/or a transportation and/or network service provider service, to allow others to submit requests for entry. In at lest some embodiments, the personal meta space may be configured to allow entry of pre-approved users, such as coworkers and/or family members. If a user wants to switch between personal and office, the motorverse service may provide and/or otherwise allow for an overlay, e.g., a visual, to switch modes easily and also transfer information and/or other materials, such as files, applications, domains, functions, services and the like between authorized participants, as long as predetermined authorization and/or security criteria are met.

Figure 2A:
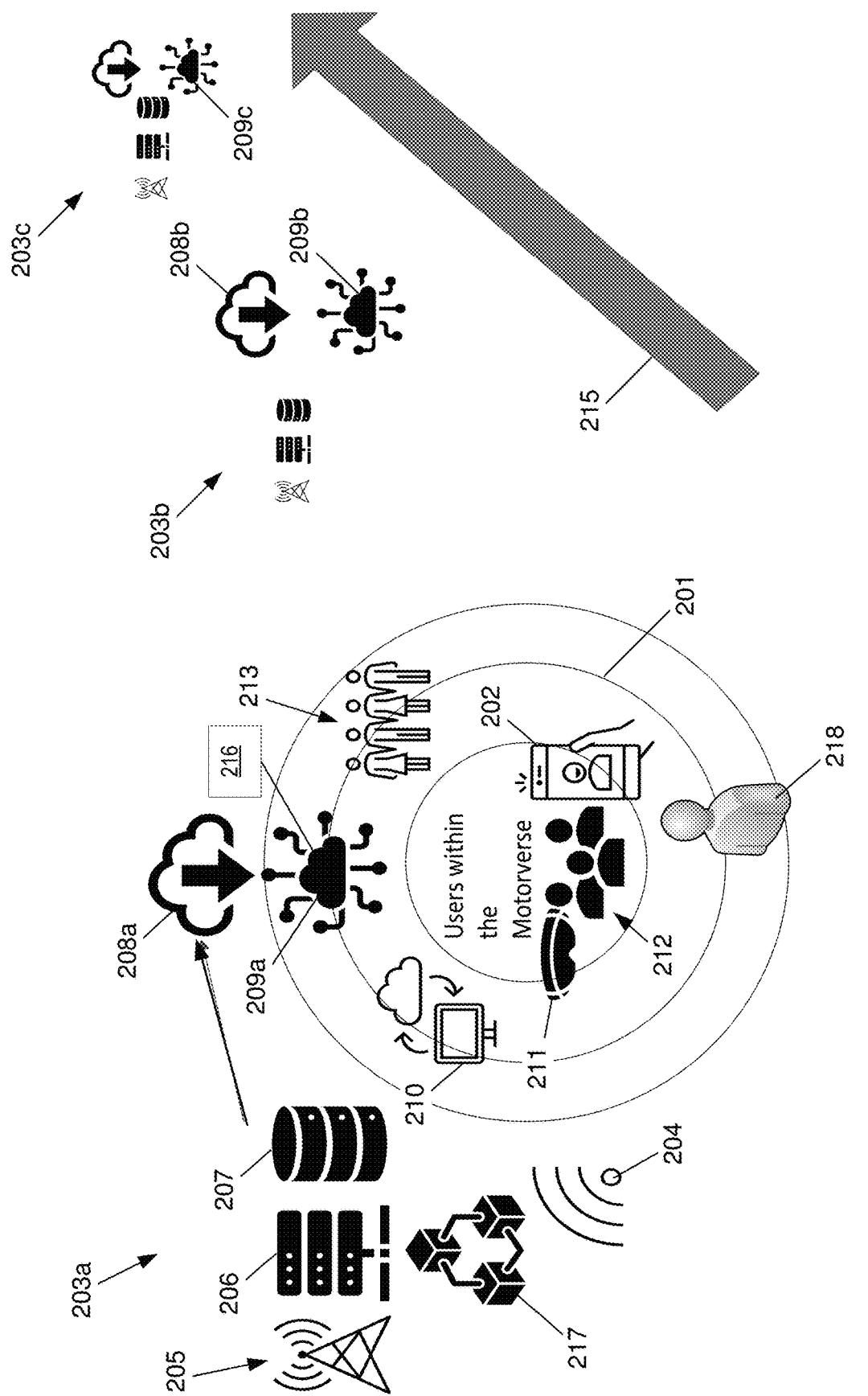
FIG. 2A is a block diagram illustrating an example, non-limiting embodiment of an edge network reconfiguration system functioning within the communication network of FIG. 1 in accordance with various aspects described herein.

FIG. 2A is a block diagram illustrating an example, non-limiting embodiment of an edge network reconfiguration system 200 functioning within the system 100 of FIG. 1 in accordance with various aspects described herein. The system 200, referred to herein as a "motorverse" system 200, includes user equipment 202 that may reside on a transportation platform, e.g., a vehicle 201. The user equipment 202 may be in communication with one or more edge portions of a more expansive network, such as the communication network 125 (FIG. 1). The edge portions may be referred to as edge networks, edge clouds, and/or edge nodes 203a, 203b, 203c generally 203. In at least some embodiments, the example edge nodes 203 are geographically separated and/or otherwise dispersed, for example, different edge nodes 203 being proximate to and/or otherwise servicing different portions of the vehicle's path 215.

Continuing with the illustrative example, the vehicle 201 may include a mobile communication terminal 204 adapted to communicate with one or more of the edge nodes 203. Similarly, each of the edge nodes 203 may include an edge node communication terminal 205 adapted to communicate with the vehicle 201, at least while the vehicle is within a communication range supported by the mobile communication terminal 204 and/or the edge node communication terminal 205. The edge nodes 203 may be in further communication with remote network resources 217, such as a core network, an affiliated network, one or more backend servers, e.g., operated by the network service provider and/or other service providers and adapted to provide online services.

By way of example, and without limitation, communication links 209*a*, 209*b*, 209*c*, generally 209, between the vehicle 201 and the edge node communication terminal 205 may be supported by one or more communication services adapted for mobile platforms, such as a mobile cellular service, a wireless LAN service, e.g., IEEE 802.11 services, such as Wi-Fi, and/or other wireless LAN services, such as Bluetooth, a satellite service, a line of sight (LoS) microwave service, millimeter wave service, a free-space optical service, a terrestrial radio service. Alternatively, or in addition, the communication links 209 may include one or more wired services, such as a traditional cable service, a fiber optic service, an ethernet service. Wireless services may be employed while the vehicle 201 is moving, whereas wired services may be employed while the vehicle 201 is stationary, e.g., at a terminus and/or a waypoint, such as a train station, a bus terminal, an airport terminal, a ferry terminal, and the like.

It is understood that an availability of any particular type of communication link 209 may vary from time to time according to network conditions, link distances, obstructions, interference, weather conditions, maintenance issues, etc. In at least some embodiments, more than one link 209 may be available at any given time and/or location. It is conceivable that different types of links 209 between the vehicle 201 and the edge nodes 203 may provide different levels of service. Different levels of service may be distinguished by one or more of data rates, bandwidth, latency, signal strength, noise and/or interference, reliability, and so on.

In at least some embodiments, the motorverse may be configured to select, establish and maintain the communication links 209. For example, the motorverse may employ a motorverse controller 216 adapted to facilitate establishing, maintaining and/or otherwise coordinating a motorverse service at the vehicle 201. For example, the motorverse controller 216 may be adapted to monitors user demand and/or user requirements, such as required application(s), data rates, latency requirements, content type, and the like. Alternatively or in addition, the motorverse controller 216 may be adapted to monitor and/or otherwise coordinate a vehicle end of the communication link 209. For example, the motorverse controller 216 may be adapted to determine channel conditions, such as signal strength, bandwidth, latency, noise floor, interference. To the extent that multiple options for the communication link 209 are available at any give time and/or location the motorverse controller 216 may implement a predetermined logic and/or policy to select from among the different types of communication links. Examples of link selection logic may include one or more of costs, demand, capacity, pre-existing access, subscription level, data rate and/or service level agreements and the like.

Each of the example edge nodes 203 may include one or more of a respective processing portion 206 or a respective storage portion 207. The processing and/or storage portions 206, 207 may be adaptable and/or otherwise configurable according to any of the examples disclosed herein and/or otherwise known to those skilled in the art. For example, one or more of the processing and/or storage portions 206, 207 may be reconfigured responsive to changes in a user's location, e.g., a location of the vehicle 201 when carrying the user as may occur during periods of travel. Any configurations may be adapted to provide a serviced and/or proximal user with access to a consistent, personalized cloud service, and/or also supporting the user's access to a rich set of online features, functions and content without necessarily imposing complex requirements on user equipment.

By way of example and without limitation, the edge node 203 and/or one or more of the processing and/or storage portions 206, 207 may be reconfigured by a remote controller, e.g., a centralized software defined network (SDN) controller and/or orchestrator. Alternatively, or in addition, the example system 200 may include a centralized motorverse controller 180 (FIG. 1) that may act alone and/or in combination with one or more of the SDN controller, the orchestrator, and/or According to the illustrative example, the vehicle 201 may be carrying one or more motorverse-participating passengers 218 associated with the user equipment 202. Each participating passenger 218 may have an associated identity, e.g., a passenger name, an alias, a username, a user ID, a subscriber ID, an account number, and/or an association, such as an employer, a school, an affinity group, and so on. Alternatively, or in addition, at least some of the participating users 218 may have an associated service subscription level, e.g., according to a network service provider subscription, a transportation service provider membership, e.g., loyalty program, and/or a motorverse subscription.

In at least some scenarios, one or more of the participating passengers 218 may have pre-established one or more computational and/or online environments and/or online environmental configurations. For example, the user 218 may have one or more associated online profiles, such as a home online profile, a business or work online profile, a gamer online profile, and so on. Each profile may be associated with a corresponding online environment that may include online computational resources, storage resources, applications, profiles, preferences, game states, media content, e.g., audio content, still image content, video content, documents. Alternatively, or in addition, at least some of the participating users may pre-established a presence in a metaverse, e.g., having identified an avatar and perhaps some ongoing activities and/or relationships.

In at least some instances, a network operator provides processing and/or storage at certain network nodes that may geographically close to network service subscribers, or might otherwise make sense from a network architecture perspective and/or network conditions. Such nodes may be referred to as edge nodes. The edge nodes may store one or more forms of data, such as documents and/or media content, which are routinely accessed and/or expected to be accessed by relatively nearby network subscribers. Consequently, the network operator may judicially select which apps and/or content are stored at which edge nodes, e.g., to reduce network traffic, to reduce latency, to minimize streaming media interruptions, and so on.

In some embodiments, the edge nodes may be adapted according to a group of users, e.g., subscribers to a particular streaming media service. Alternatively, or in addition, at least some of the edge nodes may be adapted to according to one or more individual users. In such instances, the processing and/or storage resources may be provisioned and/or otherwise configured According to the illustrative, the edge node 203 may be provisioned and/or otherwise configured to host at least a portion of a content cloud of the user According to the illustrative example, the physical transport device, or vehicle 201 is travelling along a path 215. At one time, associated with the vehicle 201 being near the beginning of the path, the vehicle 201 may establish communications the first edge node 203*a*. The vehicular motorverse controller 216 may identify one or more users 218 as candidates for using the motorverse service during a journey along the path 215. A centralized motorverse controller 180 (FIG. 1) may receive identities of candidate users as well as a location of the vehicle 201, and possibly a description of the path, possibly including start and end times, and/or speeds, as well as any intermediate stops. Either motorverse controller 216, 180 may determine user identity according to a user declaration, e.g., a request for access and/or authorization. Alternatively, or in addition, the user identity may be determined according to a location reported by the user equipment, e.g., that is coincident with the vehicle 201. In at least some embodiments, the user identity may be identified by a passenger manifesto as may be shared by a transportation service provider.

The centralized motorverse controller 180 may initiate and/or otherwise facilitate a provisioning of the network to support a delivery or one or more services, e.g., cloud services, to one or more of the identified candidate users on the vehicle 201. Such provisioning may include identification of details of a user environment, e.g., identifying applications, data, content, communication and/or computation services, and the like. The centralized motorverse controller 180 may provision and/or otherwise configure a first edge node 203a corresponding with a beginning end of the path 215. As the vehicle moves along the path 215, it will approach a physical region that may be serviced by a second edge node 203b. The centralized motorverse controller 180 may similarly provision and/or otherwise configure the second edge node 203b in anticipation for establishment of a communication link 209b between the vehicle 201 and the second node 203b. The vehicular motorverse controller 216 may determine when the first communication link 209a to the first edge node 203a should be replaced with a second communication link 209b to the second edge node 203b.

After having transitioned to the second edge node 203b, the user's apps, content and generally their online environment may be supported by provisioned equipment at the second node 203b. In at least some embodiments, a first user content cloud 208a have a first state corresponding to a first time may have been established and utilized while the vehicle 201 is in communication with the first node 203a, while a second user content cloud 208b having a second state corresponding to a second, e.g., later, time may be established and utilized while the vehicle 201 is in communication with the second node 203b. Differences between the first and second states of the user content cloud may be due at least in part to user activity that may have occurred during a first portion of the journey.

In at least some embodiments, the centralized motorverse controller 180 may reconfigure, de-authorize, re-provision and/or otherwise release any previously provisioned and/or otherwise configured portions of the first edge node 203a after the user has progressed to another edge node 203a. Once released, that portion of the edge node 203a may be reassigned to other uses and/or maintained in reserve. Such a release process may occur immediately upon determining that the vehicle 201 has successfully established motorverse service at a subsequent edge node 203b. In at least some embodiments, any release may occur after a threshold time period after the vehicle has established motorverse service with another node, e.g., to account for a possibility of reversion back to the previous node 203a.

In some embodiments, multiple participating travelers on the same vehicle may establish independent motorverse sessions with one of the edge nodes 203. Alternatively or in addition, at least some of the participating travelers may share at least a portion of motorverse session. For example, a first user 218 having established a motorverse session, may wish to invite one or more other participating travelers 213 to join in the session. Such joint sessions may be established between parties in confidence, such as coworkers, friends and/or family members. Alternatively or in addition, a joint session may be established with other participating travelers that are otherwise unknown to each other, e.g., members of the general public.

Considering the different possibilities of joint sessions, it is understood that one or more members of a joint motorverse session may establish security and/or privacy limits. Such limits may apply to one or more of applications, data, media content, game scenarios, personal information, access to online environment, meta spaces, a metaverse, and the like. To the extent that virtual reality is employed, one or more of an initiating user 218 and/or other invitees 213 may appear as avatars 212 within a presentation of the metaverse supported by the motorverse session, e.g., according to the primary user' content cloud 208a.

The vehicle 201 may include, without restriction, a private mode of transportation, such as a user's own car, van or truck. Alternatively or in addition, the vehicle 201 may include a public mode of transportation, such as an airplane, a railroad train and/or light rail vehicle, e.g., according to a railroad and/or mass-transit system, a bus, a truck, a car, such as a taxi, a limousine, a rideshare, a boat or ship, such as a ferry, an ocean liner and/or a cargo carrier and/or tanker. It is envisioned that in at least embodiments, one or more of the public modes of transportation may be operated by a transportation carrier.

In at least some embodiments, a transportation carrier may provide at least some equipment, such as a touchscreen display 210, VR headset 211, a keyboard, trackball, mouse, joystick, and/or any other suitable game controller, speakers and/or headsets, and the like. Alternatively, or in addition a participating user 218 may use their own user equipment 202.

It is envisioned that in at least some embodiments, the path 215 may be specified and/or otherwise predetermined. Examples of fixed paths 215 may include, without limitation, railways, roadways, waterways, e.g., canals, shipping lanes, air routes and/or cruise itineraries. Some paths between destinations may be positionally fixed, such as railways, and/or roadways, while others may vary such as air routes and/or shipping lanes. In at least some embodiments, a particular path between endpoints may include alternate routes, e.g., detours, backroads, and the like, that may allow for at least some variation even with respect to the positionally fixed routs.

In addition to location and/or position along a route, there may be temporal aspect. Consider that certain modes of transportation operate according to predetermined schedules, e.g., scheduled departure and/or arrival times of flights, scheduled train stops, scheduled livery service, and the like. It is understood that even in regularly scheduled routes, there may be some variation due to any number of issues, such as weather conditions, traffic conditions, road closures, railway maintenance, and so on. Nevertheless, in at least some embodiments, a user's location along any path 215 may be at lest in part by identification of a predetermined path, a scheduled and/or actual departure time, an estimated arrival time, any scheduled and/or observed arrival and/or departure times of any way points along the path, e.g., interstitial stations, and so on. Alternatively or in addition, a user's location may be declared, e.g., by the user and/or by a transportation carrier and/or some other transportation tracking service. In at least some embodiments, a user's location may be reported by an automated system, such as a GPS receiver and/or an inertial guidance system.

As discussed elsewhere herein, a user device adapted for accessing the types of online environments and/or motorverse services disclosed herein may be a simplistic, minimal hardware design, e.g., providing just enough components to access the Internet and/or to provide a user interface. To the extent the motorverse user requires additional hardware features, they may be provided elsewhere, e.g., by any combination of the transportation service provider and/or the network service provider, e.g., via SDN and/or configurable edge clouds.

This approach is well suited for situations in which a user wants to travel to different locations but does not want to carry any more hardware then absolutely necessary. The minimalist hardware may be adapted to present the user with one or more options on how to access, e.g., log into their personal, professional, network domains. As discussed elsewhere herein, a using user profile may be defined, stored, updated and/or otherwise applied to facilitate maintenance of appropriate privacy and/or security separations. A user may be allowed to switch between domains virtually, e.g., in meta space. In at least some embodiments, the user may be presented with motorverse options that may include a VR environment that allows a user to overlay screens but also maintain separation between personal and private spaces.

In at least some embodiments, the motorverse service and/support approach permits and/or otherwise enables a sharing of hardware for similar functions, e.g., Wi-Fi account. It is envisioned that in least some embodiments, e.g., during a journey with cars traveling long distances, one car may become a hub and/or "macrocell." Such a hub vehicle may be configured with enhanced hardware, software and/or firmware, e.g., receiving their own allocation of network service provider resources, e.g., their own network "slice" that may depend upon one or more of usage type, application, rate plan, subscription level, equipment compatibility, and so on. According to this example, other cars, trucks or virtually any other vehicle traveling nearby, e.g., alongside, can temporarily connect to the established hub, allowing others to access one or more resources without necessarily having to establish their own motorverse and/or network slice. Beneficially, other permitted vehicles and users can avoid getting hardware or software according to yet another configuration that may be referred to as a motorverse service. The shared resource approach may be configured and/or otherwise treated as a virtual customer premises equipment (CPE), e.g., at home/own SSID may 'camp' on the shared hardware. Such an approach would not interfere with neighbor's usage.

A network service provider or communication carrier may remotely adjust one or more adjustable features of the traveler's hardware, such as signal strength, frequency tuning, channel selection, bandwidth selection, and so forth, in hardware. Permitted users may be provided with a specific user ID and/or password to access their own online resources and/or online resources shared and/or otherwise made available by a macrocell host. Accordingly, a hardware slice provisioned to the macrocell provider may serve multiple users and/or multiple purposes. Again, although many of the examples provided herein refer to transportation platforms and/or vehicles, it is understood that they may be applied in similar manners to stationary infrastructure, such as building, houses, workplaces, public spaces, and so on. Such stationary applications may be adapted to provide similar macrocell and/or motorverse capabilities to allow other users who may temporarily enter an established motorverse location, to access the shared resources such that their needs may be served, again, with minimal requirements upon end-user equipment.

Figure 2B:
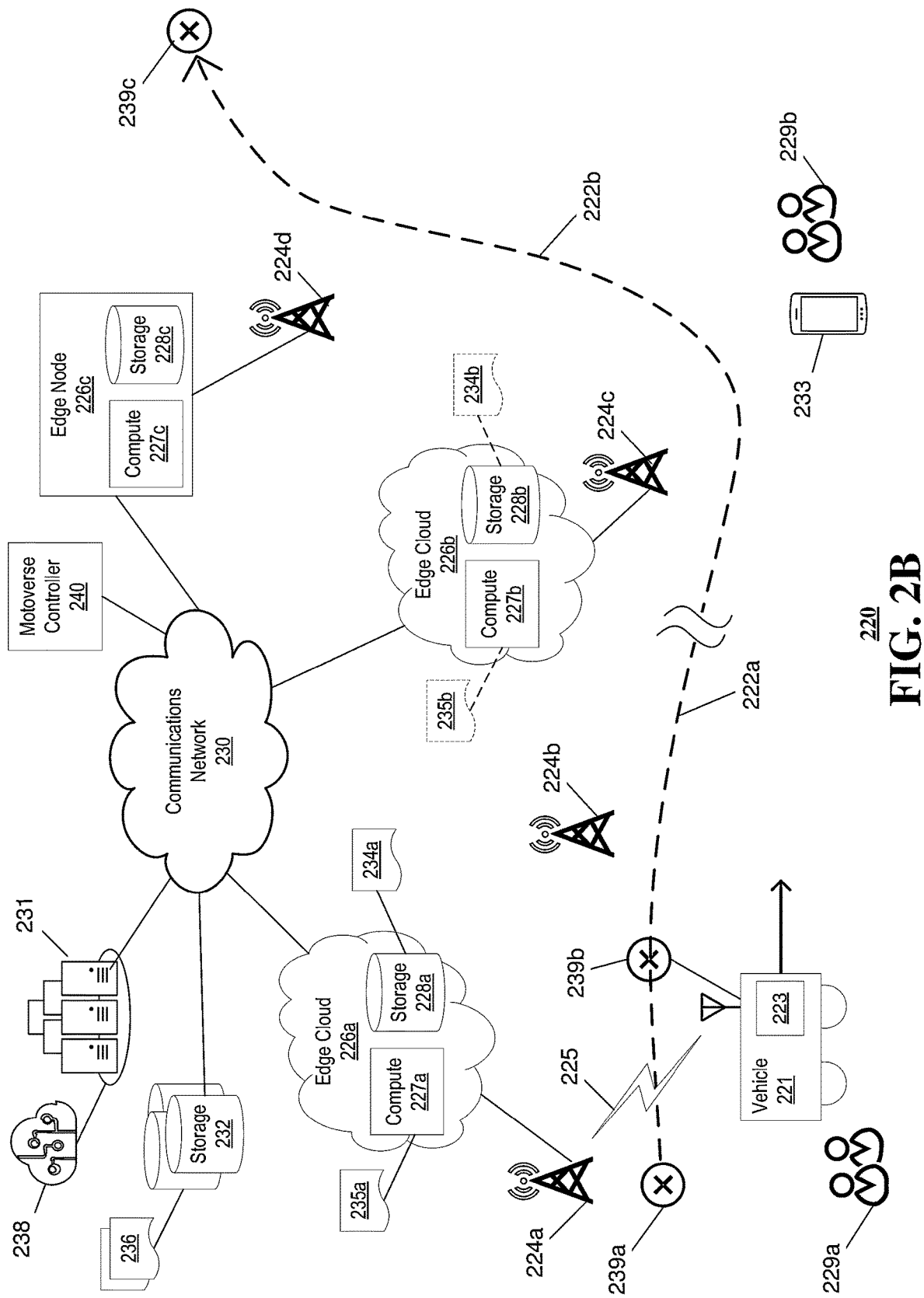
FIG. 2B is a block diagram illustrating an example, non-limiting embodiment of an edge network reconfiguration system functioning within the communication network of FIG. 1 in accordance with various aspects described herein.

FIG. 2B is a block diagram illustrating an example, non-limiting embodiment of an edge network reconfiguration system 220 functioning within the communication network of FIG. 1 in accordance with various aspects described herein. The example system 220 includes a vehicle 221 traveling along a path or route. The example path may be divided into a first rout portion 222a extending between an origin 239a and some intermediate point and the second route portion 222b extending between the intermediate point and a destination 239c. According to the illustrative example, the vehicle 221 is traversing the path, at an intermediate point 239b located along the first route portion 222a.

The vehicle 221 may be operated by a transportation service provider and includes a remote motorverse system 223. In at least some embodiments, the motorverse may include user equipment. The vehicle 221 may represent any vehicle capable of transporting persons, such as the various examples disclosed herein. For example, the vehicle 221 may carry a first group of travelers 229a. One or more members of the first group of travelers 229a may access their online environment via the motorverse system 223, which may, in turn, access a cloud service of a network service provider. In at least some embodiments, one or more other individuals 229b may be extended an opportunity to participate in an established motorverse service instance, e.g., accessible by the other individual's equipment 233.

The example system 220 also includes a communication network 230 in communication with a first edge cloud 226a and a second edge cloud 256b. The first edge cloud 226a supports motorverse services of the vehicle 221 while traversing the first portion of the path 222a. The first edge cloud 226a may include a first compute portion 227a and a first storage portion 228a. Each edge cloud 226a, 226b, 226c, generally 226, may be in communication with a respective communication terminal 224a, 224b, 224c, generally 224, adapted to support a communications link 225 between the communication terminal 224 and the vehicle 221. The first compute portion 227a may include one or more cloud processors operating according to a processor configuration 235a adapted to fulfill the user's processing requirements. More generally, the processor configuration 235a may include one or more of user software, user application files or apps, network functions, and so on. Likewise, the first storage portion 228a may include one or more cloud storage devices adapted to store user information 234a. User information 234a may include, without limitation, user profiles, user data, a user's content cloud and so on.

Likewise, the second edge cloud 226b supports motorverse services of the vehicle 221 while traversing the second portion of the path 222b. The second edge cloud 226b may include a second compute portion 227b and a second storage portion 228b. The second compute portion 227b may include one or more cloud processors operating according to a processor configuration 235b adapted to fulfill the user's processing requirements. Other edge clouds 226c may include respective compute portions 227c and respective storage portions 228c. More generally, the processor configuration 235b may include one or more of user software, user application files or apps, network functions, and so on. Likewise, the first storage portion 228b may include one or more cloud storage devices adapted to store user information

234*b*. User information 234*b* may include, without limitation, user profiles, user data, a user's content cloud and so on.

The example edge network reconfiguration system 220, may include a motorverse controller 240, in communication with one or more of the edge clouds 226 and/or the vehicle 221, e.g., via the communication network 230 and/or the edge nodes 236.

In at least some embodiments, the example system 220 may include one or more of a network-accessible, e.g., a backend, storage service 232, one or more backend servers 231 and/or one or more machine learning systems 238. The backend storage service 232 may include storage for any of the information as may be utilized by an implementation of a motorverse service, such as edge node locations, platform communication modes, user profiles, user content, ML/AI training data, and so on. The backend servers 231 may include application servers, network configuration servers, operation and maintenance severs, transportation service provider servers, e.g., as may be used in scheduling and/or tracking journeys.

In at least some embodiments, the various motorverse service applications disclosed herein may apply a ubiquitous user ID concept. Accordingly creation of a personal 'meta world' provides one or more of supporting hardware, software and network functions and/or capability that move wherever the participating motorverse user goes. A participating user may go into a workplace, e.g., a building, a connected car, a plane and log in with a specific user ID and/or password. Logging in in this manner allows the user to access a virtual screen to access and/or use the compute, and/or network, and/or other online service capabilities as may be made available at that specific location.

In at least some embodiments, optimal network and/or edge computing capabilities may be secured to support the participating user as well as any other authorized users, even while in motion. Each participating user and/or guest, may be presented with their own virtual screens, and/or a shared screen that may be sharable only by permission granting, of an authorized participating user. Once logged into this hub, the participating user and/or any gests are provided with appropriate privacy and/or security separations. This allows any one of the participating users and/or authorized guests to switch between domains, e.g., between personal and professional domains, simply, and in at least some embodiments, virtually, e.g., according to a meta space.

In a travel situation, the traveler's smartphone and/or a rented device, such as a VR glass, may be configured to support operations as a hub for hardware, software, network, and/or compute capabilities. Thus, a user's personal and/or work environments may be accessed independently and/or jointly through a ubiquitous login/user profile. For example, a gamer may have different user equipment needs than a content creator. However, through the ubiquitous user profile, the hardware device/user interface becomes the participating user's own personal device for their intended specific use, e.g., as a gamer and/or as a content creator.

If a current user setup cannot support a particular user request for a particular online activity, a utility, an application, etc., the motorverse service may be configured to provide the requesting user with a virtual environment that satisfies their requirements. For example, cloud infrastructure may be employed either by the transport service provider, the network service provider and/or an application service provider.

Figure 2C:
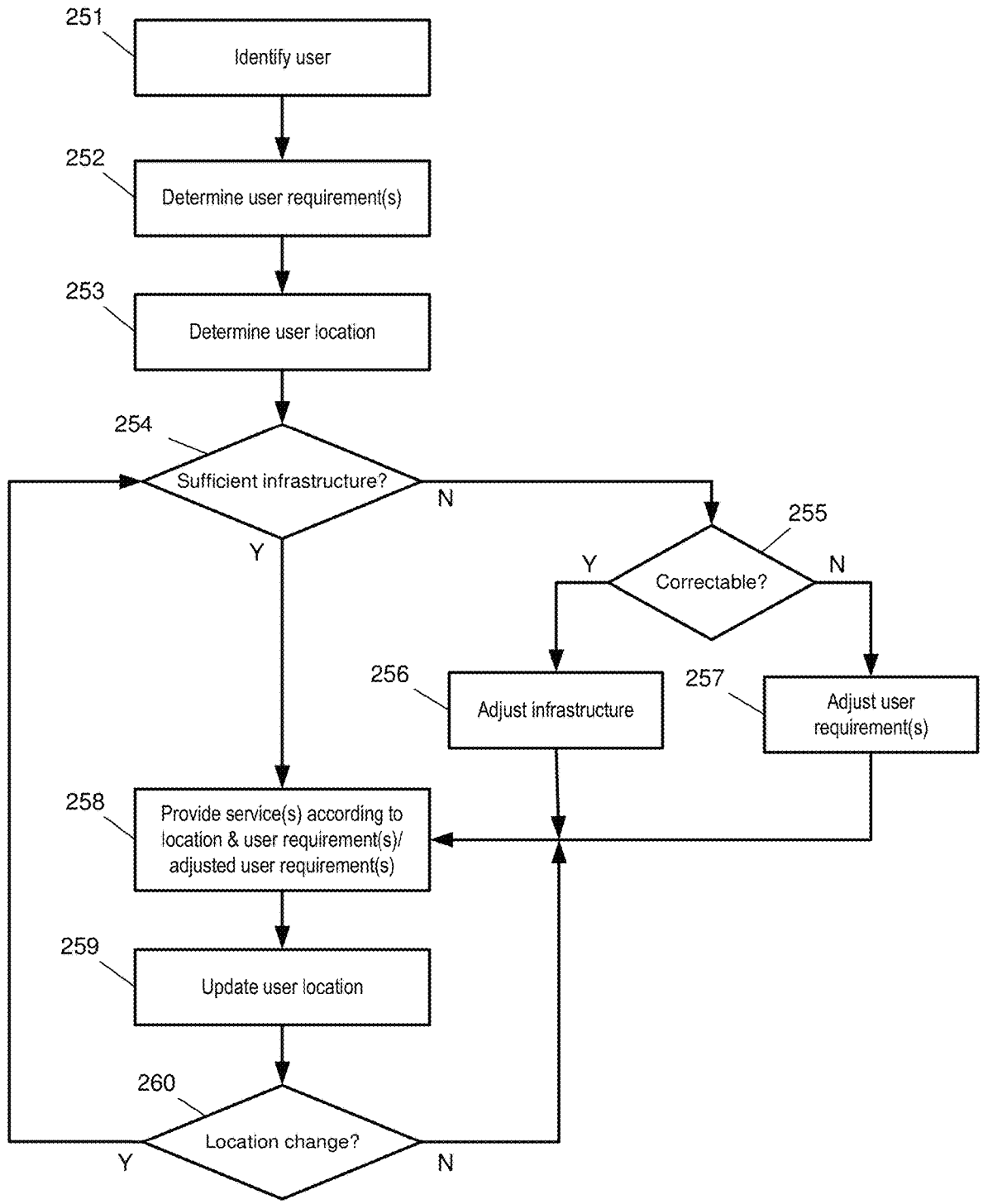
FIG. 2C depicts an illustrative embodiment of an edge network reconfiguration process in accordance with various aspects described herein.

FIG. 2C depicts an illustrative embodiment of an edge network reconfiguration process 250 in accordance with various aspects described herein. In general, the process 250 reconfigures network resources, e.g., one or more edge networks. responsive to changes in a user's location as may occur while traveling and/or during temporary stays at remote locations, e.g., while on vacation and/or during a business trip. The reconfigured network resources may provide the user with access to a consistent, personalized cloud service. For example, in at least some embodiments, a reconfiguring of edge networks may effectively allow a user's applications and/or content cloud to follow them. In at least some embodiments, such a reconfiguration of resources may facilitate user access to a rich set of online features, functions and content without imposing complex requirements on user equipment. For example, the user's cloud services may be operable by one or more relatively simple devices, such as a single tablet device and/or a wearable computer, such as a VR headset or Glass® wearable computer with a transparent display for hands-free work, available from Google LLC of Mountain View, CA. Thus, a user may access communication and/or computational resources, including one or more diverse applications, such as email, text, chat, spreadsheets, still images, video, gaming, including multiplayer interactive gaming, virtual reality, augmented reality, search engines, library resources, business application, and so on. In at least some instances, the user's remotely provisioned cloud services may be referred to as a "miniverse" environment.

A participating traveler or user may be identified at 251. Identification of the user may be accomplished by any suitable technique, including the examples disclosed herein. For example, the user may self-declare, e.g., by logging into a motorverse service, by simply carrying wireless user equipment, such as a smartphone, smartwatch, tablet onto a transportation platform adapted to provide a motorverse service, to respond to an invitation to access the motorverse service as may be provided by a motorverse service provider, a transportation service provider, and/or another user who has subscribed to the motorverse service.

In at least some embodiments, one or more use requirements may be identified at 252. User requirements may be identified according to any suitable technique, such as self-declaration, e.g., a user identifies one or more requirements for a motorverse session, such as required apps, types of content, equipment requirements, such as screen size, resolution, audio preferences, latency requirements, and so on. Alternatively or in addition, user requirements may be identified according to a user profile that may be stored and/or otherwise retained or accessed by a motorverse service provider, a transportation service provider and/or a network service provider. The user profile may indicate subscription level, subscribed applications, owned and/or otherwise accessible content sources, user preferences, including any of the example requirements disclosed herein, historical records of past motorverse sessions and/or past interactions with a user's online environment, and the like.

It envisioned that in at least some embodiments, user requirements may be inferred. Such inference may be drawn from the user's identity, socioeconomic status, job type, employer, age, gender, race, ethnicity, nationality. Alternatively or in addition, inferences as to the user requirements may be drawn from other information, such as a time of day, day of the week, location of the user, mode of transportation, destination and/or travel route, a user's calendar entries, prior travel patterns, and so on. For example, if the user is a consultant traveling alone or with coworkers, e.g., from the same employer, at a beginning of the week, it may be inferred they are on a work trip and that they will require resources commonly used by professionals on work travel, e.g., access to business email, online business email, business telephone and/or messaging services, business apps, such as word processors and/or spreadsheets and the like. Alternatively, if the user is traveling with a family member, it may be inferred the user is on vacation and may require resources commonly used by vacationers, e.g., social media, movies, gaming apps, and the like.

An approximate location of a user may be determined at 253. In some embodiments, the user's location may be self-reported, e.g., the user logs into a motorverse session and identifies their location, e.g., at American Airlines, Gate K10 at O'Hare Airport. In at least some embodiments, a user's location may be inferred from an identified travel plan, e.g., an identified transportation carrier and/or transportation route and/or scheduled trip. In such instances, the user's location can be associated with a corresponding transportation platform, such that when a scheduled trip departs, it may be presumed that the user is onboard the corresponding vehicle. Alternatively, or in addition, the user's approximate location may be obtained from user equipment, e.g., according to a GPS receiver of a smartphone and/or user device location as may have been determined by a mobile network operator.

According to the process 250, it may be determined, at 254, as to whether sufficient network infrastructure is available to satisfy fulfillment of the one or more user requirements. Sufficient infrastructure may include a sufficient computational platform to host and/or otherwise support user application requirements and/or content processing requirements. Alternatively, or in addition, sufficient infrastructure may include a sufficient storage platform to store at least a portion of user content. For example, a user may have an associated content cloud that may have storage and/or processing requirements that may be compared to available processing and/or storage capacity at an edge node 203 (FIG. 2A).

To the extent it is determined at 254 that sufficient network infrastructure is not available, a further determination may be made at 255 as to whether the network infrastructure deficiency is correctable. For example, a configurable edge node 203 may not have yet been configured according to a user's requirements but have available capacity that may be configured. Consider an edge node 203 with spare processing capacity, such that one or more processors may be instantiated to provide the user with a required online experience, and/or one or more storage devices that may be allocated and/or otherwise available to host content of the user's content cloud.

To the extent it is determined at 255 that the network infrastructure is correctable, the process 250 proceeds to adjust, reconfigure and/or otherwise provision network infrastructure at 256 as may be necessary to correct for the deficiency, e.g., provisioning and/or otherwise configuring the edge node 203. Alternatively, to the extent it is determined at 255 that the network infrastructure is not correctable, the process 250 may initiate an adjustment at 257 to the one or more user requirements, e.g., some portion of the user's requirements may go unsatisfied as long as there remains a deficiency. This may be experienced by a reduced data rate, a reduced screen size, a reduced quality, a reduced storage capacity and/or restricted access to one or more apps. In either instance, the process 250 may proceed to provide and/or otherwise make available one or more services at a proximal region around the location according the one or more user requirements and/or the one or more adjusted user requirements. Likewise, to the extent it is determined at 254 that available infrastructure is sufficient to satisfy the one or more user requirements, the process 250 also proceeds to extend to the user and/or otherwise provide access to the services at 258.

The process 250 may periodically update the user's location at 259. For example, the user's location may be measured, reported and/or otherwise inferred throughout the user's journey. Such updates may be periodic, e.g., occurring with at least some regularity, e.g., every few seconds, or every few minutes, or every 10's of minutes, or hours. Alternatively, or in addition, the user's position may be updated according to progress of a journey. For example, an airplane trip that includes a connection may have an extended period during which the user remains stationary at an intermediate airport. In such instances, a periodic reporting may be implemented during in-flight portions of the journey and paused during layovers. Once again, any determination of the user's location may use any of the example techniques disclosed herein and/or otherwise generally known to those skilled in the art.

A determination may be made at 260 as to whether the user's operational location changed. It is envisioned that in at least some embodiments, a first edge node 203a (FIG. 2A) may have sufficient communication range to accommodate at least a first portion of the user's journey. At some point, the user may have travelled beyond a usable range from the first edge node 203 and/or a first communication terminal supporting the first edge node 203. With sufficient coverage overlap, the traveler may appear within a coverage region of a second edge node 203b, before they had exceeded a coverage region of the first edge node 203a. Such overlapping coverage would allow the user's journey to progress without interruption to motorverse service.

A determination as to a change in location sufficient to initiate a transfer from one edge node 203a to another 203b may be based on one or more of a physical distance, a transmit and/or received wireless signal level at either the vehicle or the wireless terminal supporting either edge node 203a, 203b, an error performance, e.g., a bit error rate, an A/B comparison of any of the foregoing between the two edge nodes 203a, 203b. In at least some embodiments, a determination that the user's location has changed sufficiently to justify a transfer between edge nodes 203a, 203b may be based on the location change and/or measured parameter(s) exceeding some value, such as a minimum value, a threshold value and/or a triggering value.

To the extent it is determined at 260 that there has been no location change, or that any location change failed to exceed some threshold value, the process 250 continues to provide services at 258 according to the user's location and one or more requirements. However, to the extent it is determined at 260 that there has been a location change, e.g., a change in location that exceeds some threshold value, the process 250 may continue to determine at 254, whether sufficient network infrastructure is available to satisfy fulfillment of the one or more user requirements proximate to the updated location.

According to a motorverse service and/or a related user analysis, a transportation carrier may identify a participating user, their location, and possibly one or more of a user profile, which may have been generated based on information that the user volunteered, along with user usage history, metrics, deep level analysis, etc. The transportation carrier may perform an analysis for providing a "motorverse" service, which may refer to the transportation platform or vehicle that will carry the users from one location to next. In at least some embodiments, the vehicle, suitably configured with a motorverse service, may then becomes a hub for one or more, and perhaps all other users within a specific proximity, e.g., radius, or within a particular seating region, car, and/or airplane. Hardware capabilities of equipment supporting the motorverse service may be matched against the participating users' requirements to ensure that the motorverse service is capable of support the users' needs. In at least some embodiments, the transportation and/or network service provider may allot more hardware, software, apps, and/or general motorverse capabilities, to serve the users' needs. The transportation carrier and/or network service provider may create a special category, e.g., a private network, for participating users that may be traveling together. Such provisioning may include one or more of hardware, software, applications, capabilities, services, and the like.

In at least some embodiments, a motorverse service may utilize monitoring. For example, a user's location may be monitored. In at least some embodiments, the location monitoring may be employed at a rate that corresponds to the user's motion. If the user is stationary, then monitoring may occur according to a first schedule, e.g., rarely. If the user happens to be moving, then the monitoring may be employed at a more frequent rate. In at least some embodiments, a rate of the monitoring may vary according to a user's speed. Thus, for a relatively slow-moving user, their position is monitored at a first rate, whereas, for a relatively fast-moving user, their position is monitored at a second rate, wherein the second rate is faster than the first rate. In at least some embodiments, e.g., for users in motion, their position may be being monitored constantly.

In at least some embodiments, the participating users, e.g., co-passengers of a particular journey or vehicle, may be monitored for security, needs, usage, privacy, etc. Edge network nodes and/or edge cloud location selection may be based upon the user's geo-coordinates. It is understood that the user's edge network node, or edge cloud may move corresponding to movements of the user. Without limitation, movement of a user and/or edge network node and/or edge cloud may traverse one or more of distances, borders, oceans, and the like. In at least some embodiments, the user's content cloud may follow user, occasionally, periodically and in at least some instances, virtually constantly, updates through identify verification.

As discussed elsewhere herein, ML and/or AI may be applied to one or more aspects of a motorverse application. In at least some embodiments, a federated learning approach may be utilized, e.g., based on a user-level analysis as may be applied to an overall motorverse deployment. Learning may include ingestion of pre-approved "flight plan" or travel path and/or passenger manifests. Having accessed these types of information, an edge authentication may be performed in advance to increase any likelihood that the user's motorverse service experience is seamless. In at least some instances, a dynamic spectrum allocation may be utilized, e.g., Band X (where Band X is Band Y with Y MHz extension of spectrum) that is provided as needed (when usage becomes too high on a specific band).

Figure 2D:
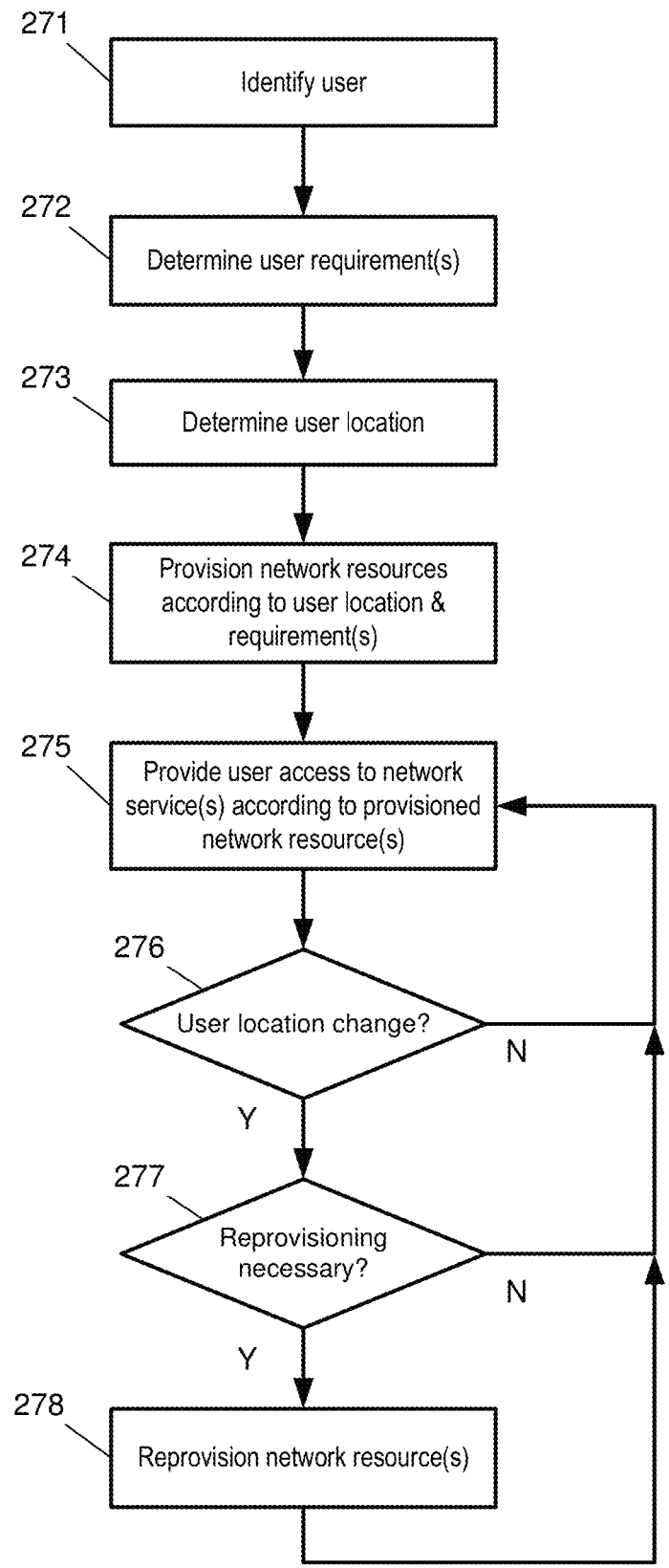
FIG. 2D depicts an illustrative embodiment of another edge-network reconfiguration process in accordance with various aspects described herein.

FIG. 2D depicts an illustrative embodiment of another edge-network reconfiguration process 270 in accordance with various aspects described herein. According to the example process 270, a participating traveler and/or user may be identified at 271. Identification of the user may be accomplished by any suitable technique, including the examples disclosed herein. For example, the user may self-declare, e.g., by logging into a motorverse service, by simply carrying wireless user equipment, such as a smartphone, smartwatch, tablet onto a transportation platform adapted to provide a motorverse service, to respond to an invitation to access the motorverse service as may be provided by a motorverse service provider, a transportation service provider, and/or another user who has subscribed to the motorverse service.

According to the example process 270, one or more user requirements may be determined at 272. Determination of user requirements may include any suitable technique, such as any of the various examples disclosed herein. An approximate location of a user may be determined at 273. Once again, determination of a user location may include any suitable technique, such as any of the various examples disclosed herein.

Having determined the user's location and requirements, the example process 270 provisions and/or otherwise configures supporting network resources, at 274. The network resources, e.g., at least one edge node 203 (FIG. 2A), may be suitably provisioned and/or configured according to the user's location and requirements. The example process 270 may provide the user with access to network services, at 275, according to the suitably provisioned and/or configured network resources. For example, the network services may extend the user's home and/or office online environment to a remote location according to the user's journey.

In at least some embodiments, the process 270 may monitor a location of the user to determine, at 276, whether their location has changed. Such location determination and/or monitoring may include any suitable technique, such as the various examples provided herein. To the extent it is determined, at 276, that there is no substantial change to the user's location, e.g., at least no change significant enough to cause and/or otherwise require a reconfiguration of the network resources, e.g., the edge nodes 203, the process 270 continues to provide the user with access to the network services according to the already provisioned and/or configured network resources. However, to the extent it is determined, at 276, that there has been a change in the user's location, the process 270 may make a further determination, at 277, as to whether any re-provision and/or re-configuring of the network resources as may be necessary. To the extent it is determined that a change is required, the process 270 re-provisions and/or otherwise reconfigures the network resources, at 278.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems 200, 220 and processes 250 and 270 presented in FIGS. 1, 2A, 2B, 2C, 2D and 3. For example, virtualized communication network 300 can facilitate in whole or in part reconfiguring edge network resources of a network responsive to changes in a user's location during periods of travel, to provide the user with access to a consistent, personalized cloud service, while also supporting the user's access to a rich set of online features, functions and content without imposing complex requirements on user equipment.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall, which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

The example virtualized communication network 300 includes a remote controller 181 and a central controller 180. The remote controller 181 may include a traveling cloud services controller, sometimes referred to herein as a "motorverse" controller. The remote controller 181 may be in communication with one or more elements of the example network 300 either directly and/or via a network connection. According to the example, the remote controller 181 is in communication with the virtualized network function cloud 325 via the transport layer 350. The centralized controller 180 may be in communication with one or more of the virtualized network function clouds 325 and the cloud computing environment 275. One or more mobile platforms, such as the example vehicle 201 (FIG. 2A), may be configured with user equipment 202 (FIG. 2A). In at least some embodiments, the user equipment 202 may be adapted to implement the remote controller 181. For example, the user equipment 202 may be adapted to download a motorverse app to allow the user equipment to fulfill the role of the remote controller 181, e.g., implementing at least a portion of the functionality of the motorverse controller 216 (FIG. 2A). The remote controller 181 in combination with the central controller 180 and/or one or more other elements of the network 300, e.g., the virtualized network function cloud 325 and/or the cloud computing environment, may be adapted to reconfigure edge cloud resources of the system 200 (FIG. 2A) responsive to changes in a user's location during periods of travel, to provide the user with access to a consistent, personalized cloud service.

Figure 4:
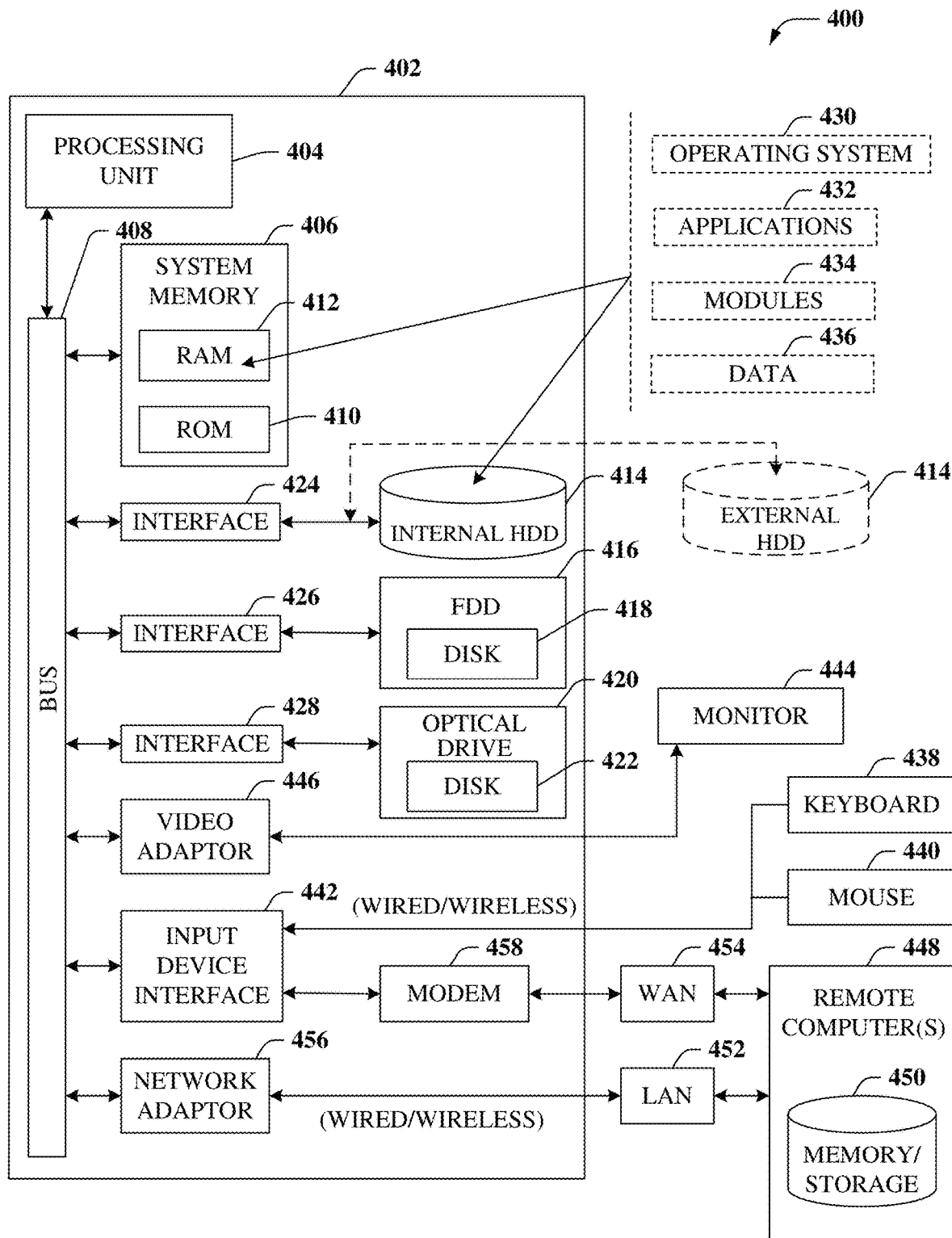
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part reconfiguring edge network resources of a network responsive to changes in a user's location during periods of travel, to provide the user with access to a consistent, personalized cloud service, while also supporting the user's access to a rich set of online features, functions and content without imposing complex requirements on user equipment.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out, anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
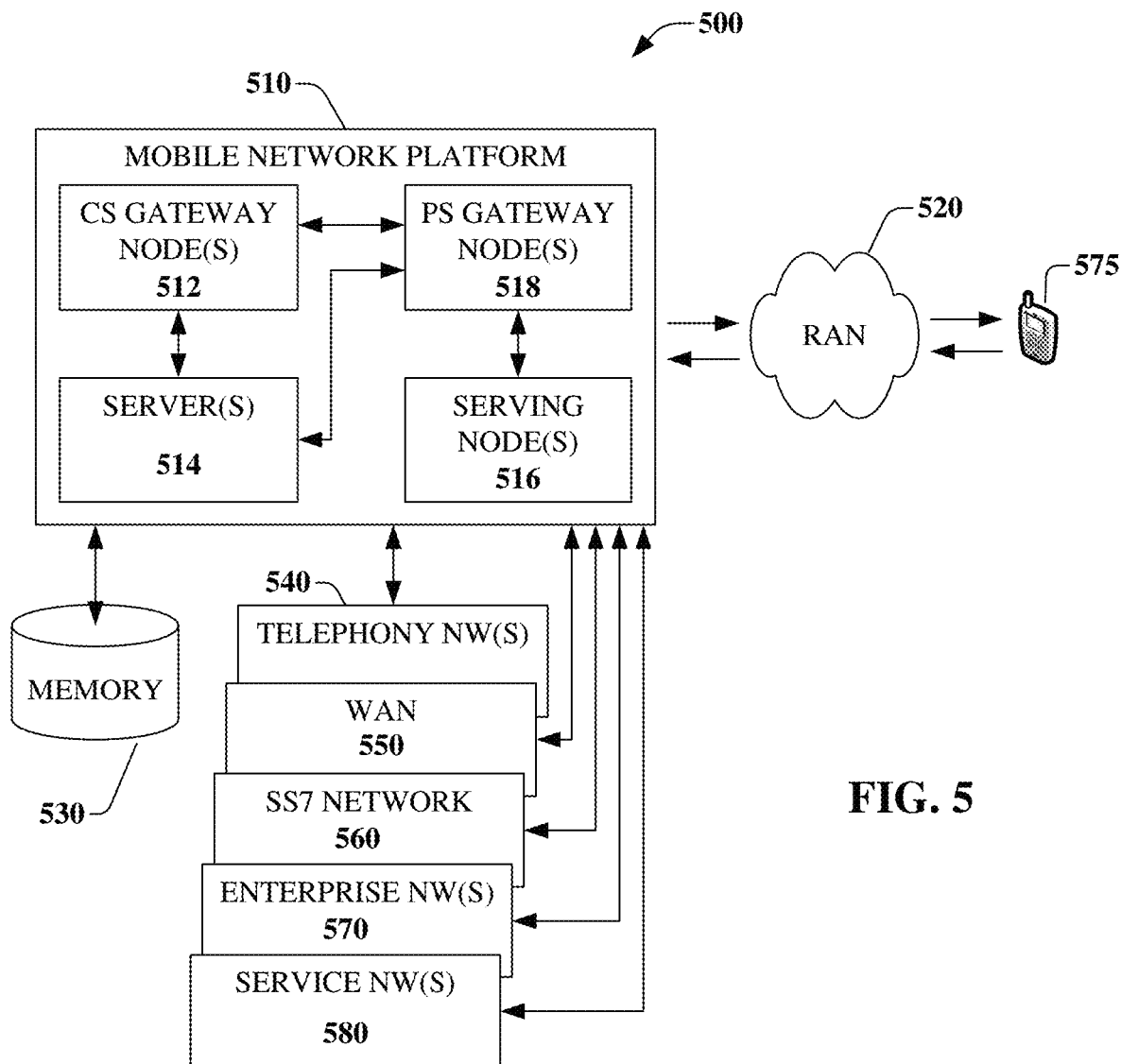
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part reconfiguring edge network resources of a network responsive to changes in a user's location during periods of travel, to provide the user with access to a consistent, personalized cloud service, while also supporting the user's access to a rich set of online features, functions and content without imposing complex requirements on user equipment. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
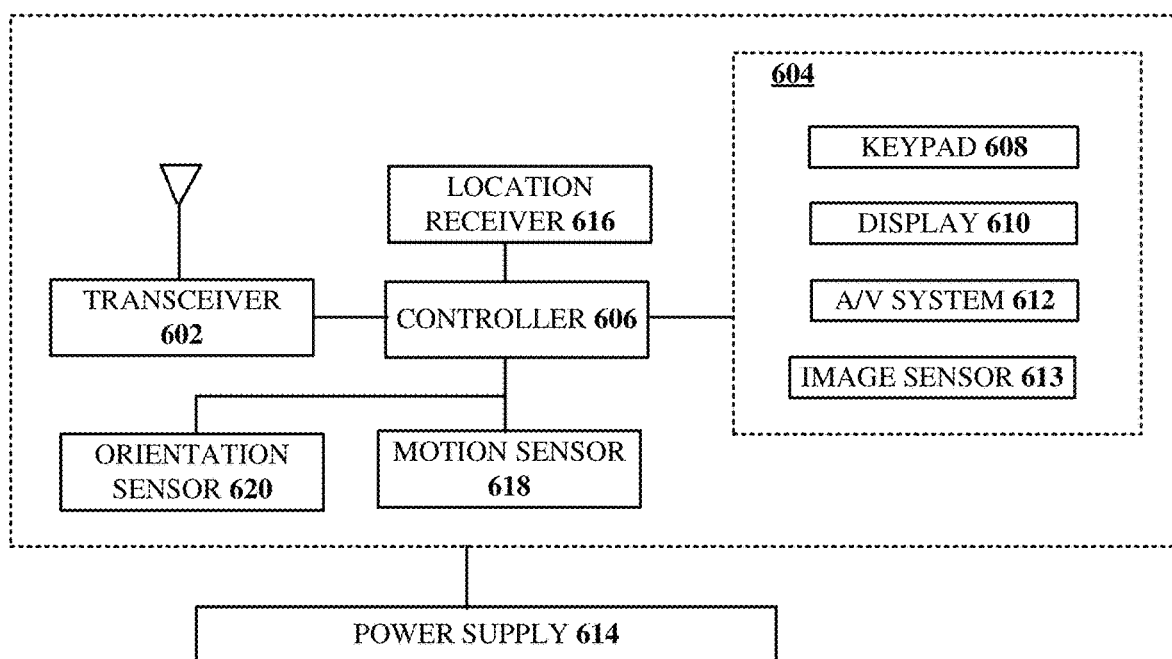
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part reconfiguring edge network resources of a network responsive to changes in a user's location during periods of travel, to provide the user with access to a consistent, personalized cloud service, while also supporting the user's access to a rich set of online features, functions and content without imposing complex requirements on user equipment.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Access to any of the example motorverse services may be accomplished via a user profile analysis. For example, a user's needs may be assessed according to their personalized profile and those needs may translated into one or more of an environmental need, e.g., a processing, networking, communication and/or storage requirement, so that hardware, software, communication infrastructure, and/or network functions may be adjusted, e.g., according to their respective capacities and/or capabilities, to dynamically update and effectively move wherever the user goes.

At least some of the motorverse service configurations apply similar hardware for similar functions. For example, considering Wi-Fi account, a full neighborhood of users may link into a microcell configured with enhanced hardware, e.g., having received its own slice, which may be shared with the neighbors. Sharing may depend upon the neighbor's usage type, rate plan, etc.

The disclosure makes several references to the term "motorverse," e.g., as in a motorverse service, system, and/or application. Other terms that may be used interchangeably with motorverse include, without limitation, a motoverse, a mobile motoverse, a metaspace, and/or a mobile metaspace. A metaspace may include, without limitation, an online environment, e.g., a workspace, a desktop, a webpage, a cyberspace, and the like, that may be accessed from one or more physical locations that may be fixed, mobile and/or some combination of both. In at least some embodiments, a metaspace may transcend ordinary physical space, e.g., providing a conceptual space that may be occupied by metaobjects. Alternatively or in addition, a metaspace may include a metaverse environment, service and/or experience, that may provide access to and/or facilitate operation within a virtual environment. Without limitation, a virtual environment may include a shared and/or otherwise persistent virtual environment, e.g., according to a virtual reality, such as a metaverse.

In at least some embodiments the motoverse refers to a mobile metaspace adapted to extend a user's online experience beyond a fixed or anchored space, such as a home or office. Without limitation, the terms fixed and/or anchored may refer to one or more of a particular network access point device and/or geolocation, a particular hardware device and/or group of hardware devices and/or systems, referred to generally as hardware platforms, and/or a particular geolocation, physical area, facility, such as a home and/or business address, and the like. Mobile platforms may include moving platforms, e.g., vehicles. Alternatively or in addition, mobile platforms may include platforms at a substantially fixed location, that may be distinguished from a remotely located home, office, or otherwise anchored location.

The mobile metaspace may be provided on a vehicle, such as an airplane, a car, public transport, such as a train and/or a ship, and the like. In at least these applications, and without limitation, the "motorverse" may be characterized as a mobile metaspace that provides for some and/or up to all of a user's resource needs permitting user access to an online experience that may include a personalized online experience. In at least some embodiments, the metaspace online experience may approximate and/or otherwise match, copy and/or reproduce a user's fixed and/or anchored online experience.

The mobile metaspace may be provided at, on and/or to a mobile platform and may include one or more of a physical device, hardware, e.g., a user interface, a display device, a camera, a camera array, a 3D presentation device and/or camera, an audio presentation device, a microphone, a microphone array, a network interface device, a network, a service, a compute platform, applications, accessories, and so on. In at least some embodiments, the motorverse may include and/or otherwise depend upon one or more agreements, e.g., between and/or among one or more service providers, one or more network providers, one or more application and/or service providers, and/or more generally with any, so called, third party. For example, a transportation carrier, such as a major airline, may have reached an agreement with a network service provider and/or application service provider that extends and/or otherwise supports an online experience on transportation vehicles operated by the airline.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data.

Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   identifying, by a processing system including a processor, an identity of a traveler according to a traveler's declaration including a request for access and authorization to a personalized cloud service;
   determining, by the processing system, a personalized cloud service requirement based on the identity of the traveler;
   determining, by the processing system, a first location, wherein the traveler is proximate to the first location at a first time;
   provisioning, by the processing system, a first edge cloud resource, to obtain a provisioned first edge cloud resource, based on the personalized cloud service requirement and according to the first location of the traveler, wherein the traveler is provided access to the personalized cloud service via the provisioned first edge cloud resource;
   determining, by the processing system, a second location, wherein the second location differs from the first location;
   re-provisioning, by the processing system, a second edge cloud resource, to obtain a provisioned second edge cloud resource, based on the personalized cloud service requirement and according to the second location of the traveler, wherein the traveler is provided access to the personalized cloud service via the provisioned second edge cloud resource; and
   releasing and de-authorizing the access to the personalized cloud service via the provisioned first edge cloud resource as the traveler has progressed to the second location.

2. The method of claim 1, wherein the personalized cloud service comprises an operating system, an application, a document, a virtual desktop, media content, a persistent virtual reality, or any combination thereof.

3. The method of claim 2, further comprising:
   determining, by the processing system, a traveler authorization that permits access by another user to an identified portion of the personalized cloud service; and
   facilitating, by the processing system, access by the other user to the identified portion of the personalized cloud service according to the traveler authorization.

4. The method of claim 1, wherein the personalized cloud service presents a configurable online user environment.

5. The method of claim 4, wherein the configurable online user environment comprises one of a virtual reality environment or an augmented reality environment.

6. The method of claim 4, wherein the configurable online user environment presents a plurality of different functions supported by the personalized cloud service, without imposing corresponding functional requirements on user equipment providing traveler access to the plurality of different functions.

7. The method of claim 6, wherein the user equipment comprises a network interface and a thin client.

8. The method of claim 1, further comprising:
identifying, by the processing system, a predetermined route; and
anticipating, by the processing system, the second location according to the predetermined route, wherein the re-provisioning the second edge cloud resource is accomplished in anticipation of the traveler being proximate to the second location.

9. The method of claim 8, further comprising:
identifying, by the processing system, a transportation service provider, wherein the identifying the predetermined route is according to the transportation service provider.

10. The method of claim 1, wherein the determining the second location further comprises:
identifying, by the processing system, a location of a transportation vehicle, the traveler occupying the transportation vehicle.

11. The method of claim 1, further comprising:
determining, by the processing system, that the traveler is proximate to the second location at a second time, later than the first time; and
releasing, by the processing system, the first edge cloud resource.

12. The method of claim 11, further comprising:
confirming, by the processing system, that the traveler has accessed the personalized cloud service via the provisioned second edge cloud resource, wherein the releasing the first edge cloud resource is responsive to the determining that the traveler has accessed the personalized cloud service via the provisioned second edge cloud resource.

13. The method of claim 1, further comprising:
introducing, by the processing system, a virtual reality presentation into a persistent virtual reality environment of the personalized cloud service provisioned via the second edge cloud resource, the virtual reality presentation persisting in the persistent virtual reality environment while the traveler is proximate to the second location.

14. The method of claim 13, wherein the virtual reality presentation comprises an avatar adapted to a local custom of the second location.

15. A device, comprising:
a processing system including a processor; and
a memory that stores executable instructions that, when executed by the processing system, facilitate performance of operations, the operations comprising:
determining an identity of a user by receiving a location of a vehicle, a description of a path including start and end times and speeds, a location reported by a user equipment that is consistent with the vehicle, a request for access and authorization, or a combination thereof;
determining a personalized network service requirement based on the identity of the user;
determining a first location;
configuring a first edge network resource, to obtain a configured first edge network resource, based on the personalized network service requirement and according to the first location, wherein the user is provided access to a personalized cloud service via the configured first edge network resource;
determining a second location, wherein the second location differs from the first location;
configuring a second edge network resource, to obtain a configured second edge network resource, based on the personalized network service requirement and according to the second location, wherein the user is provided access to the personalized cloud service via the configured second edge network resource; and
releasing and de-authorizing the access to the personalized network service via the configured first edge network resource as the user has progressed to the second location.

16. The device of claim 15, wherein the operations further comprise:
determining a proximity of the user to the second location, wherein access to the personalized cloud service via the configured second edge network resource is responsive to the proximity.

17. The device of claim 15, wherein the configuring a second edge network resource further comprises applying software defined networking.

18. A non-transitory, machine-readable medium, comprising executable instructions that, when executed by a processing system including a processor, facilitate performance of operations, the operations comprising:
determining a personalized cloud service requirement based on an identity of a user;
determining a first proximity of the user to a first location;
configuring a first edge network resource, to obtain a configured first edge network resource, based on the personalized cloud service requirement and the first location, wherein the user is provided access to a personalized cloud service via the configured first edge network resource according to the first proximity of the user to the first location;
determining a second location, wherein the second location differs from the first location;
configuring a second edge network resource, to obtain a configured second edge network resource, based on the personalized cloud service requirement and according to the second location, wherein the user is provided access to the personalized cloud service via the configured second edge network resource according to a second proximity of the user to the second location; and
releasing and de-authorizing the access to the personalized cloud service via the configured first edge network resource as the user has progressed to the second location.

19. The non-transitory, machine-readable medium of claim 18, wherein the operations further comprise:
determining a proximity of the user to the second location, wherein access to the personalized cloud service via the configured second edge network resource is responsive to the proximity.

20. The non-transitory, machine-readable medium of claim 18, wherein the configuring a second edge network resource further comprises an application of software defined networking.

* * * * *